June 13, 1950     E. F. HISCOCK     2,511,263
PARACHUTE CONSTRUCTION
Filed Dec. 13, 1945                                           2 Sheets-Sheet 1
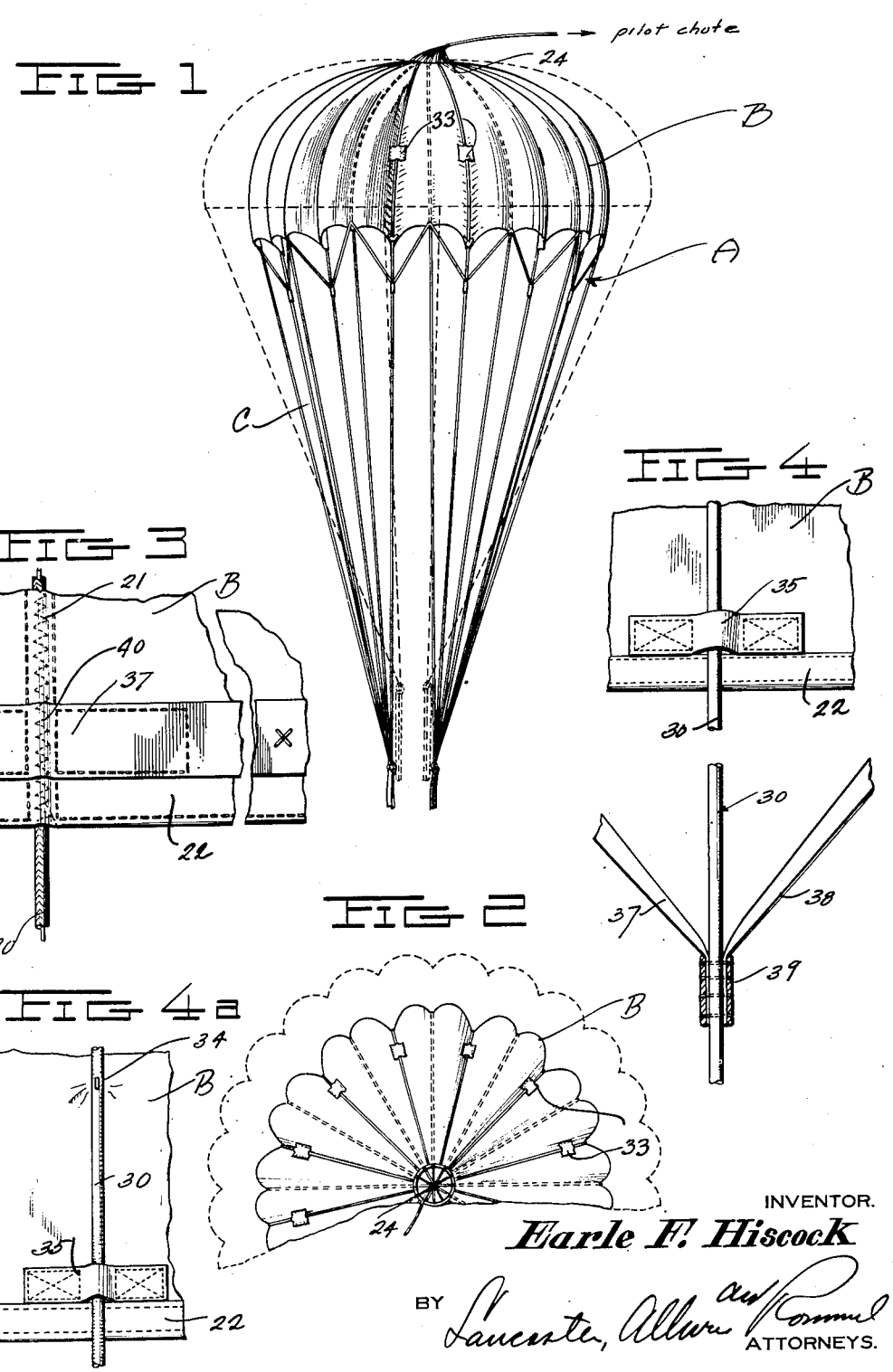
INVENTOR.
*Earle F. Hiscock*
BY
ATTORNEYS.

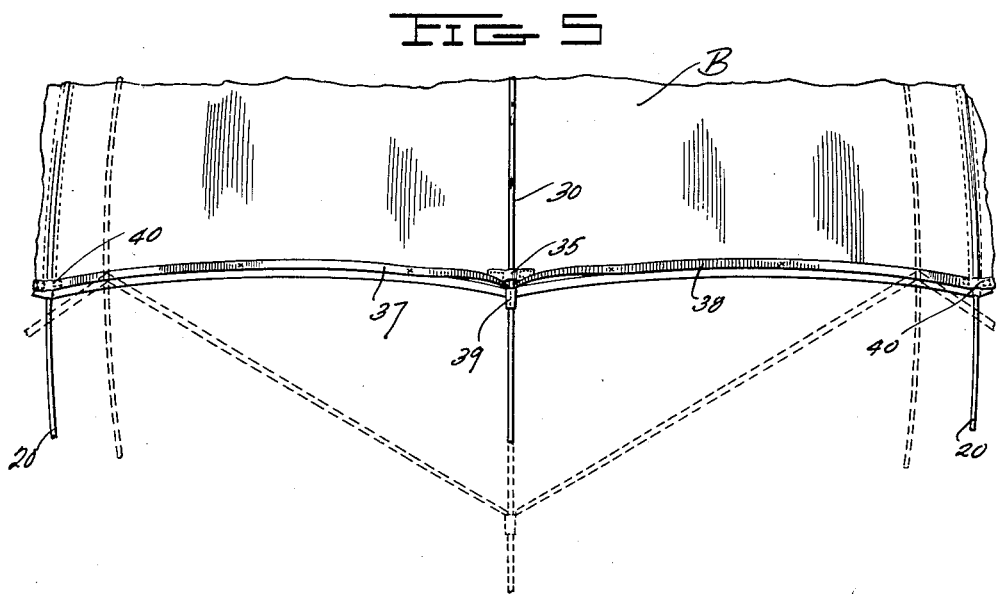
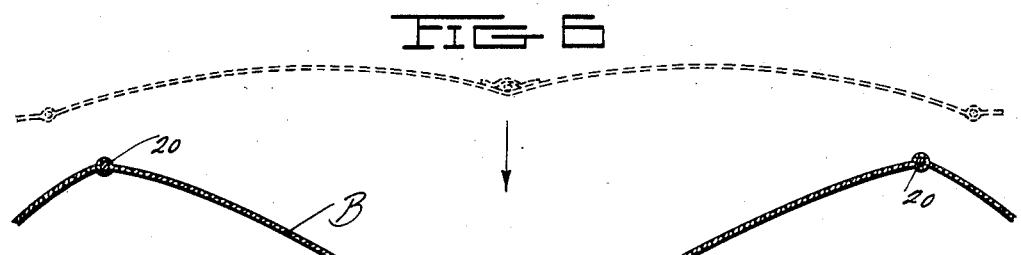
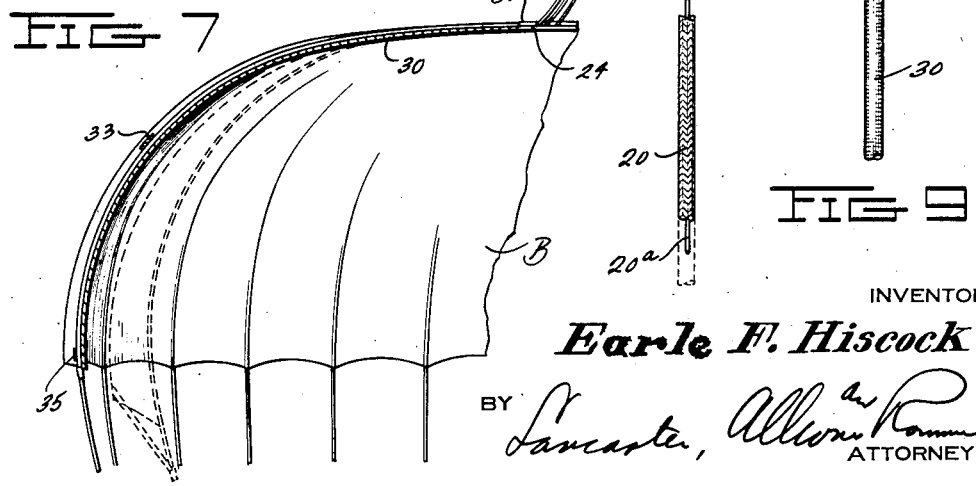
INVENTOR.
Earle F. Hiscock

Patented June 13, 1950

2,511,263

UNITED STATES PATENT OFFICE 2,511,263

PARACHUTE CONSTRUCTION

Earle F. Hiscock, Arlington, Va.

Application December 13, 1945, Serial No. 634,751

10 Claims. (Cl. 244—145)

1

This invention relates to improvements in parachute constructions.

The primary object of this invention is the provision of an improved canopy structure for parachutes which will materially lessen the shock opening of the parachute upon the individual or load to be supported.

A further object of this invention is the provision of an improved parachute canopy construction having an improved shroud line construction associated therewith of a nature to damp oscillation during a parachute descent.

A further object of this invention is the provision of an improved parachute structure having an improved association of shroud lines thereon of a nature to pneumatically compress air within the canopy just after the shock opening of the canopy during a parachute descent and act with a bellows-like motion, with an alternating increase and decrease of air compression and thus producing a resistance to shock upon the individual or load.

Other objects and advantages of the invention will be apparent from the following detailed description.

In the accompanying drawings, forming a part of this specification, and wherein similar reference characters designate corresponding parts throughout the several views, Figure 1 is a side elevation of a parachute canopy and the improved shroud line structure showing in full lines the compressive contraction of the canopy and in dotted lines the outline which the canopy will assume in full or substantially full distension.

Figure 2 is a bottom plan view of the parachute canopy showing in full and dotted lines the characteristics explained with respect to Figure 1.

Figure 3 is an enlarged fragmentary view showing the connection of a normal shroud line to the canopy and showing the attachment of an improved cordage or tape structure therewith.

Figure 4 is a fragmentary view showing an improved shroud line and associated structure with respect to the canopy.

Figure 4ᵃ is a view showing a break cord connection of the improved shroud line structure with the canopy of the parachute.

Figure 5 is a fragmentary view showing the relation of normal attached shroud lines upon the canopy with an improved compression shroud line structure.

Figure 6 is a view showing in full and dotted lines the manner in which the parachute canopy will be compressed and distended in a bellows-like action during descent functioning of the parachute.

Figure 7 is a fragmentary view showing the mode of attachment of the shroud line structure to the canopy.

Figure 8 is a fragmentary view of an extensible shroud line structure.

Figure 9 is a fragmentary view showing a non-elastic or non-extensible shroud line.

In the drawings, wherein for the purpose of illustration is shown only a preferred embodiment of the invention, the letter A may generally designate the improved parachute which may include a canopy structure B and shroud line arrangement C.

With respect to the canopy B, the same may be made in accordance with conventional practice, of segments or gores connected upon radial seams; the gores being made of fabric strips arranged upon the bias in the manner similar to that shown in U. S. Patent 1,427,772, or the canopy may be constructed in any approvide manner best suited for the purpose for which it is intended to be used. It may be provided with a vent structure and a pilot parachute connection, in accordance with conventional practice.

While I do not intend to limit myself to the precise shroud line structure described, I prefer to utilize shroud lines 20 which, as shown in Figure 3 of the drawings, are connected in the seam structures of the canopy B and stitched fixedly thereto by zig-zag stitching 21 of a nature and for a purpose well understood by those skilled in the art to which this invention relates. These shroud lines 20 are connected to the hem structure 22 of the canopy B; the hem structure 22 preferably reinforcing the marginal edge of the canopy, and the shroud lines 20 extend along the canopy and are affixed thereto in radial position at the point of the ring vent 24 (Figure 7 of the drawings). From this point these shroud lines 20 extend loosely to provide a connection for a conventional pilot parachute (not shown), and they extend continuously down the other side of the parachute canopy where they are similarly connected to the parachute canopy by means of zig-zag stitching.

In alternating or otherwise recurrent association with the shroud lines 20 I propose to use canopy compression type shroud lines 30 which have a fixed connection at 31 with the ring vent 24 or at a similar location upon the top of the canopy; these shroud lines 30 being extended radially over the top of the canopy either thru means of guide sleeves 33 wherein they are slidable, or by means of break threads 34, and at the hem of the canopy B they are slidably extended thru strip loops 35, as shown in Figure 4, and thence continued for connection to the harness. In manner similar to the association of conventional shroud lines 20 with the canopy these lines 30 may be continuous over the top of the canopy extending loosely for connection with the pilot parachute and thence continued down over the opposite side in the same manner as above described thru slip loops 33 and 35, or by means of break threads being attached to the canopy structure.

If desired, I may use shroud lines 20 and 30 having the same inherent characteristics, or the shroud lines 20 may have a spiral braided structure which will admit of their extension in an elastic fashion, and they may carry a core structure 20ᵃ of rubber or synthetic elastic material. In contradistinction, the shroud lines 30 are relatively non-elastic or non-extensible with respect to the shroud lines 20.

The shroud lines 30 below their slip loop connection 35 with the canopy B are each provided with tapes or cords 37 and 38 at opposite sides connected at 39 by a sleeve and transverse stitching fixedly with the cord 30. At their opposite ends they are connected at 40 by stitching with the main canopy and adjacent shroud lines 20. These tapes 37 and 38 may be extensible or non-extensible, that is, elastic or non-elastic material. While I refer to them as tapes or cords, they may be of any flexible fabric or material which will serve the purpose of fixedly connecting the shroud lines 30 to the canopy hem connection of the shroud lines 20 so as to permit the canopy to have a bellows-like motion at the time of opening of the parachute.

While I have shown the lines 20 and 30 as alternating across the circumference of the parachute canopy, this arrangement may be departed from if desired. These shroud lines 20 and 30 may have a special connection with the webs of the parachute harness, but as shown in Figure 1, they are connected in conventional manner to the usual pull harness webs.

During the parachute jump, after the rip cord is pulled, the pilot parachute, if one is used, will anchor and pull the main parachute out of the pack container as the load descends. As the air enters the hem part of the parachute canopy, it will billow or bulge the top of the canopy without appreciable shock, as yet, upon the load, but as the air compresses within the canopy and tends to fully billow the canopy, the compression of the air within the canopy will cause the latter to have a bellows-like action; the cords 30 pulling to the position shown in Figures 1 and 4 and compressing the diameter of the canopy while the cords 20, due to their fixed connection with the canopy, have a tendency to permit the canopy to fully deploy. The cords 30 will slide along the canopy and a bellows-like action of the canopy will result for the purpose of buffing or damping out the shock upon the load. This action continues and, of course, will prevent or damp out oscillation. In fact, any time that the parachute has a tendency to swing and oscillate the load, the bellows-like action will commence and continue until the load is stabilized.

It is apparent from the foregoing that, thru the medium of air compression, resistance is offered to shock upon the load. The depression of the canopy caused by the shroud lines 30, of course, compresses the air under the parachute canopy and the alternating increase and decrease in circumference of the parachute canopy and volume of air in the canopy produces a spring action. This, of course, takes place at the time when there is a tendency of the fully deploying parachute canopy to cause a shock upon the load, btu this load is absorbed thru the spring action above described. The elastic quality of the regular shroud lines, in case such is taken advantage of, prevents excessive stress being transmitted to points of attachment of the same upon the canopy and canopy edge or hem.

It is of course obvious that the novel structural features above described may be utilized in connection with the lowering of any type of load.

Various changes in the shape, size and arrangement of parts may be made to the form of invention herein shown and described, without departing from the spirit of the invention or the scope of the claims.

I claim:

1. In a parachute structure the combination of a flexible canopy, regular shroud lines fixedly connected upon the canopy structure and extending therefrom for load attachment purposes, other shroud lines connected with the upper portion of the canopy structure and otherwise being connected with the canopy structure for sliding therealong at the time of deployment of the canopy structure, and flexible members fixedly connected with said other shroud lines adjacent the hem of the canopy and having fixed connection adjacent to the canopy hem at the points of connection of the first mentioned shroud lines with the canopy.

2. In a parachute structure the combination of a flexible canopy, regular shroud lines fixedly connected upon the canopy structure and extending therefrom for load attachment purposes, other shroud lines connected with the upper portion of the canopy structure and otherwise being connected with the canopy structure for sliding therealong at the time of deployment of the canopy structure, and flexible members fixedly connected with said other shroud lines and extending laterally at each side of the shroud line and having fixed connection with the canopy adjacent the points of connection of the adjacent first mentioned shroud lines with the canopy.

3. In a parachute the combination of a canopy, shroud lines having fixed attachment with the canopy radially therealong and extending below the hem of the canopy for load attachment purposes, other shroud lines connected with the top of the canopy in alternating relation with the first mentioned shroud lines and being constructed and arranged radially along the canopy between the first mentioned shroud lines for sliding with respect to the canopy at the time of deployment of the latter, said second mentioned shroud lines extending below the hem of the canopy for load connecting purposes, and compression lines connected with the second mentioned shroud lines adjacent the hem of the canopy and extending therefrom at each side and at their opposite ends being connected with the canopy hem and the first mentioned shroud lines adjacent thereto at the points of connection of the first mentioned shroud lines with the hem of the canopy.

4. In a parachute construction the combination of a flexible canopy having a ring vent opening and a hem, regular shroud lines connected with the ring vent and radially connected along the canopy and to the hem and extending below the hem for load connecting purposes, other shroud lines connected to the ring vent and constructed and arranged with respect to the canopy for sliding with respect thereto radially thereupon upon deployment of the canopy and extending below the hem of the canopy for load connection, said other shroud lines being recurrently arranged with respect to the regular shroud lines, and compression lines connected with the said other shroud lines adjacent to the hem of the canopy and extending therefrom for connection with the hem of the canopy adjacent to the points of connection of the regular shroud lines with the hem of the canopy.

5. In a parachute construction the combination of a flexible canopy having a ring vent opening and a hem, regular shroud lines connected with the ring vent and radially connected along the canopy and to the hem and extending below the hem for load connecting purposes, other shroud lines connected to the ring vent and constructed and arranged with respect to the canopy for sliding with respect thereto radially thereupon upon deployment of the canopy and extending below the hem of the canopy for load connection, said other shroud lines being recurrently arranged with respect to the regular shroud lines, and compression lines connected with the said other shroud lines adjacent to the hem of the canopy and extending therefrom for connection with the hem of the canopy adjacent to the points of connection of the regular shroud lines with the hem of the canopy, said regular shroud lines having more longitudinal extensibility than the second mentioned shroud lines.

6. In a parachute construction the combination of a flexible canopy structure, load supporting shroud lines fixedly connected upon the canopy structure and extending therefrom for load connection with a parachute harness, and recurrently disposed load supporting shroud lines connected to the top of the canopy and extending over the outer surface of the canopy with a sliding fit and having their lower ends connected with the first mentioned shroud lines to a parachute harness in a load supporting relation therewith.

7. In a parachute construction the combination of a flexible canopy structure, load supporting shroud lines fixedly connected upon the canopy structure and extending therefrom for load connection with a parachute harness, recurrently disposed load supporting shroud lines connected to the top of the canopy and extending over the outer surface of the canopy with a sliding fit and having their lower ends connected in a load supporting connection with the first mentioned shroud lines to a parachute harness, and means below and adjacent to the skirt of the canopy fixedly connected to the slidable parachute lines and extending divergently therefrom and having connection with the said skirt of the canopy.

8. In a parachute construction the combination of a flexible canopy structure, parachute harness having load supporting webs, load supporting shroud lines fixedly connected along the canopy structure radially thereupon and extending from the canopy and having a load supporting connection with the harness webs, and other load supporting shroud lines having a fixed point of connection upon the canopy structure at the upper portion of the canopy structure and otherwise being associated with the lower portion of the canopy structure so as to have a sliding action thereupon at the time of deployment of the canopy structure for air spring compression of the canopy structure, and means connecting the last mentioned shroud lines to said harness webs in a load supporting relation.

9. In a parachute construction the combination of a flexible canopy structure, parachute harness having load supporting webs, load supporting shroud lines fixedly connected along the canopy structure radially thereupon and extending from the canopy and having a load supporting connection with the harness webs, and other load supporting shroud lines having a fixed point of connection upon the canopy structure at the upper portion of the canopy structure and otherwise being associated with the lower portion of the canopy structure so as to have a sliding action thereupon at the time of deployment of the canopy structure for air spring compression of the canopy structure, said other load supporting shroud lines being recurrently disposed upon the canopy structure with respect to said first mentioned shroud lines, the last mentioned shroud lines also having a load supporting connection with the harness webs.

10. In a parachute construction the combination of a flexible canopy structure, parachute harness having load supporting webs, load supporting shroud lines fixedly connected along the canopy structure radially thereupon and extending from the canopy and having load supporting connection with the harness webs, other shroud lines having a fixed point of connection with the canopy structure at the upper portion of the canopy structure and otherwise being associated with the lower portion of the canopy structure so as to have a sliding action thereupon at the time of deployment of the canopy structure for air spring compression of the canopy structure, said other load supporting shroud lines being alternately disposed upon the canopy structure with respect to said first mentioned shroud lines and having at their lower ends a load supporting connection with the harness webs.

EARLE F. HISCOCK.

REFERENCES CITED

The following references are of record in the file of this patent:

UNITED STATES PATENTS

| Number | Name | Date |
| --- | --- | --- |
| 2,089,140 | Tricau | Aug. 3, 1937 |
| 2,119,183 | Sedlmayr | May 31, 1938 |
| 2,358,233 | Jorgensen | Sept. 12, 1944 |
| 2,384,127 | Nailor | Sept. 4, 1945 |
| 2,393,634 | Horak | Jan. 29, 1946 |

FOREIGN PATENTS

| Number | Country | Date |
| --- | --- | --- |
| 745,847 | France | Feb. 27, 1933 |